United States Patent [19]

Beem et al.

[11] 4,147,576

[45] Apr. 3, 1979

[54] METHOD OF REPAIRING A VEHICLE BODY

[76] Inventors: Lewis W. Beem, 15856 Riley; Leo D. Beem, 1632 Lakewood Blvd., both of Holland, Mich. 49423

[21] Appl. No.: 773,610

[22] Filed: Mar. 2, 1977

[51] Int. Cl.² .............................................. B29H 19/00
[52] U.S. Cl. ..................................... 156/94; 29/401 E
[58] Field of Search ......................... 206/223, 225, 582; 156/94; 428/63; 264/36; 29/401 E

[56] References Cited

U.S. PATENT DOCUMENTS

| 3,189,509 | 6/1965 | Needham | 428/63 |
|---|---|---|---|
| 3,251,461 | 5/1966 | Smith | 206/582 |
| 3,470,048 | 9/1969 | Jones | 156/94 |
| 3,850,718 | 11/1974 | Trapani | 156/94 |
| 3,907,107 | 9/1975 | Vercollone | 206/223 |

OTHER PUBLICATIONS

Simplex Plastic Products literature, P. O. Box 2101 Monroe Blvd. Sta., Dearborn, Mich., 2/4/59.

*Primary Examiner*—Douglas J. Drummond
*Attorney, Agent, or Firm*—Price, Heneveld, Huizenga & Cooper

[57] ABSTRACT

The specification discloses a method and a kit for repairing surfaces, particularly vehicle surfaces, in which the surface to be repaired is covered by adhering a plastic sheet having beveled edges thereto, followed by sanding the beveled edges and adhering sealant to at least the visible edges, feathering the sealant so as to create a smooth surface, followed by painting the repaired area.

4 Claims, 5 Drawing Figures

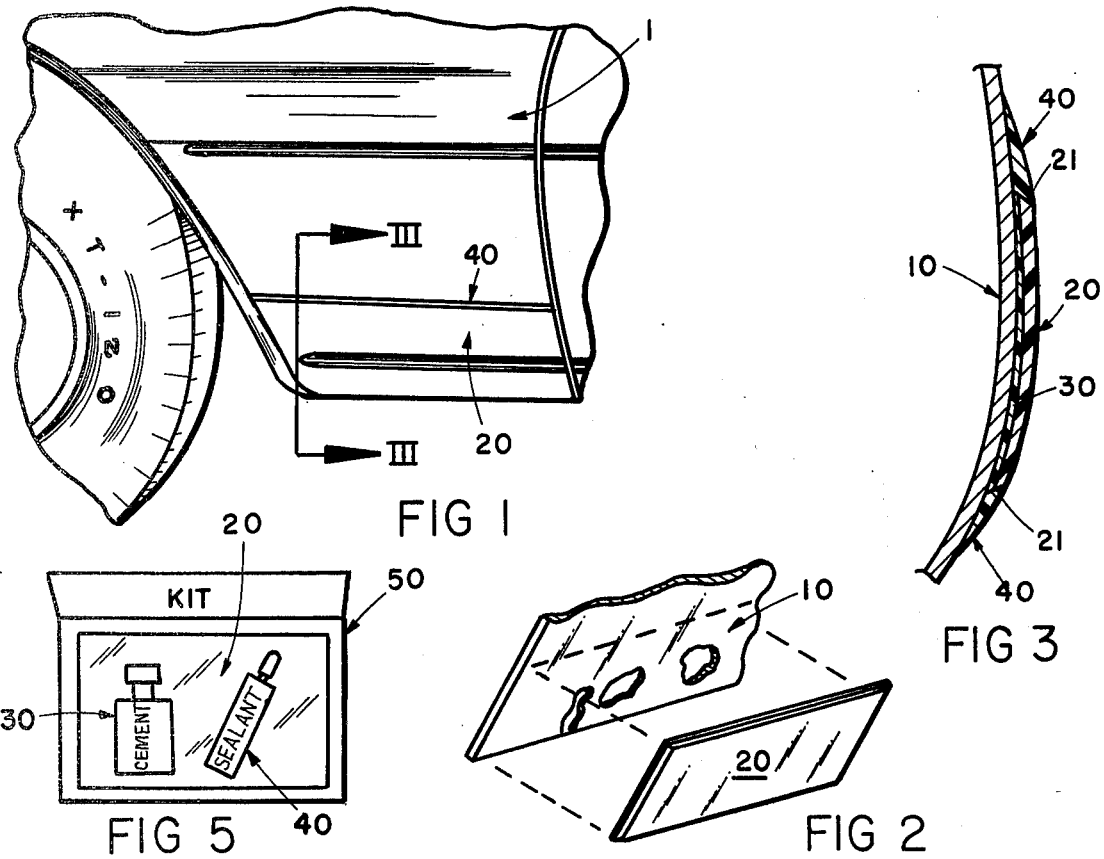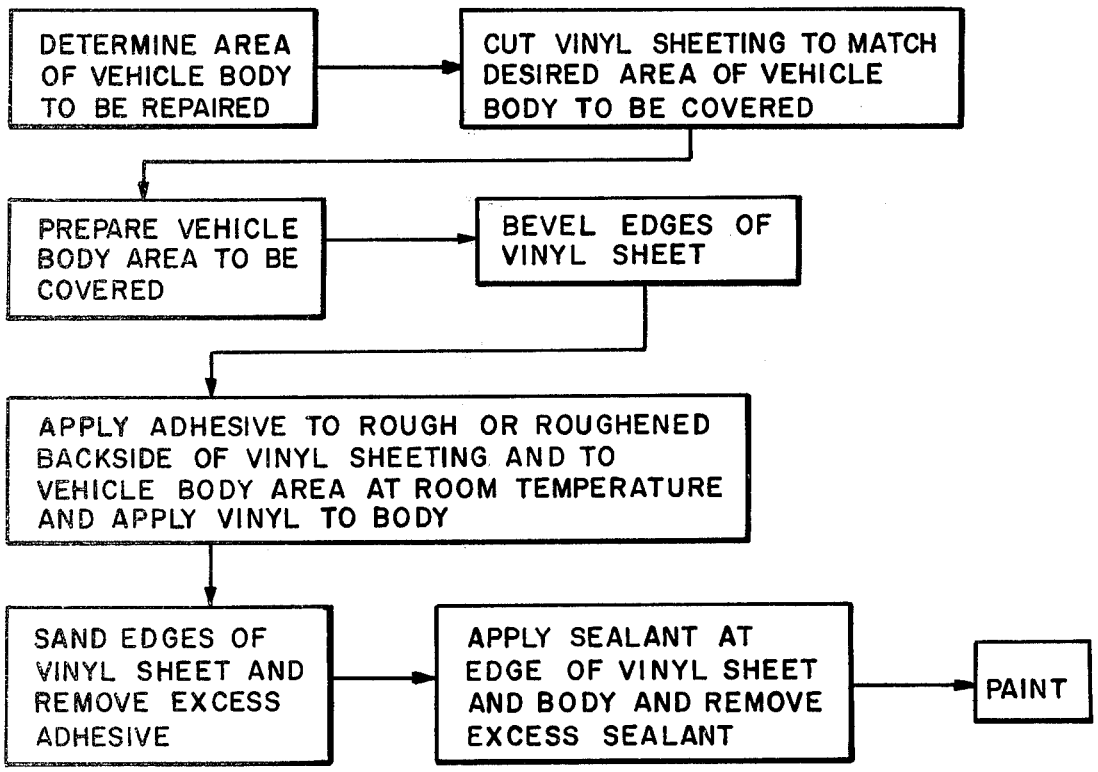

METHOD OF REPAIRING A VEHICLE BODY

BACKGROUND OF THE INVENTION

The present invention relates to repairing damaged surfaces, particularly vehicle body surfaces. One common method for repairing such surfaces is to employ a putty to fill in holes and dents, followed by sanding the putty after it has dried and then painting. One problem with this very common method is that the putty tends to fall out due to vibration or rusting in the area around the putty, or both. Also, once an area of a vehicle begins to rust, adjacent areas tend to rust more quickly and it has done little good to have puttied one particular area.

Fiberglass cloth is sometimes used to repair larger areas, particularly where there are holes. A chemical adhesive is used which must be exposed to sunlight in order to harden. The fiberglass cloth is then coated with a putty, sanded and painted. This system is very difficult to work with and requires a fairly high degree of skill.

Another prior art method involves employing a piece of metal foil which is adhered to the surface to be repaired with an adhesive. It is difficult to insure that the foil will be smooth and this method is practical only over very small areas.

Sheet metal is sometimes used to repair large areas. It is difficult to secure the sheet metal to the vehicle body, with sheet metal screws usually being necessary and being difficult to conceal. Even then, the sheet metal must often be puttied over since it does not conform particularly well to the surface being repaired. If the sheet metal is bare, it has to be treated with acid prior to painting.

All in all, the processes available are quite difficult to use and are costly when done by a professional and not particularly good looking when done by an amateur.

SUMMARY OF THE INVENTION

The present invention employs a method and articles wherein a sheet of plastic is used to cover the area to be repaired after the area has been made reasonably smooth and free of excessive flaking rust. The sheet of plastic is sufficiently pliable that it can be manually shaped to conform generally to the area to be repaired, but is sufficiently rigid that it resists oil canning, denting and other localized deformation. One manually shapes the plastic to conform generally to the area to be repaired and the edges of the sheet are beveled so that they blend into the vehicle surface. The sheet is adhered to the vehicle area with an adhesive and the entire repaired area is painted over.

Preferably, a sealant is employed at least along the visible edges of the plastic sheet. This sealant is of a material which dries firm, but resilient, whereby cracking is minimized. The sealant is applied to the edges and feathered out onto the body surface so as to create a smooth flowing surface overall.

The result is a process which is relatively inexpensive to perform and which can be done by an amateur to create a reasonably good looking repaired surface. These and other objects, advantages and features of the invention will be more fully understood and appreciated by reference to the written specification and appended drawings.

BRIEF DESCRIPTION OF THE DRAWINGS

FIG. 1 is a fragmentary view of an automobile whose front rocker panel has been repaired in accordance with the method of the present invention;

FIG. 2 is a fragmentary view showing a sheet of plastic in accordance with the present invention spaced from an area which has to be repaired;

FIG. 3 is a cross sectional view taken along plane III—III of FIG. 1;

FIG. 4 is a flow diagram illustrating the steps employed in accordance with the method of the present invention; and FIG. 5 is a front elevational view of a kit in accordance with the present invention.

DESCRIPTION OF THE PREFERRED EMBODIMENT

In the preferred embodiment, the rusted area 10 (FIG. 2) of the vehicle 1 (FIG. 1) is covered with a plastic sheet 20 which is held in place by means of a contact adhesive 30 (FIG. 3). The beveled edges 21 of the plastic sheet 20 are sealed by the application of an edge sealant 40 which is feathered out from the plastic sheet onto the surface of the vehicle to create a smooth appearance. The materials necessary to practice this method can be provided in kit form as shown in FIG. 5 wherein a plastic kit container 50 contains a plastic sheet 20, a contact adhesive 30 and a sealant 40.

The plastic sheet 20 is preferably a sheet of polyvinyl chloride material. Polyvinyl chloride is reasonably resistant to solvent attack from most commercial contact cements and has a surface to which paint, either lacquer or enamel, adheres.

The particular sheet plastic employed must not be brittle. It has been found that the type of polyvinyl chloride sheet used as a house or building siding works very well in practicing the present invention.

Plastic sheet 20 must have sufficient pliability that it can be manually shaped to conform generally to the area to be repaired. Yet, it must be sufficiently rigid to resist oil canning, denting and other localized deformations. It has been found that for areas where there is a sharp bend on the vehicle body, or for small repair jobs, a sheet of polyvinyl cloride about 20 mils thick is best. For larger areas, and for areas where no sharp bends are required, a sheet of polyvinyl chloride having a thickness of approximately 40 mils is best. The thicker sheet is particularly good where it is being applied over a large opening in the metal or plastic body of the car since the 40 mil thick sheet gives greater rigidity to the final repair job.

The adhesive 30 which is employed to adhere plastic sheet 20 to the area 10 to be repaired is preferably a contact cement. It is applied to the area 10 to be repaired and to the rear surface of plastic sheet 20. The rear surface of plastic sheet 20 should be roughened prior to application of the contact cement. This can be accomplished by sanding just prior to application of the contact cement. In the alternative, a plastic sheet having a molded-in roughened rear surface can be employed. Most contact cements commonly available on the market can be employed. For safety purposes, it is peferable to employ a non-flamable contact cement. One commercially available product called "Con-Bond" (TM) is available from Columbia Cement Company of Freeport, N.Y., and works very well in practicing the invention.

The edge sealant 40 employed must be of a material which dries firm, but remains resilient. This is to prevent cracking which might otherwise occur with vehicle vibration. A caulking which would dry hard would not be satisfactory since it would eventually crack and flake out. A silicon tub caulking works very well as sealant 40. Dow Chemical makes such a product and another sealant which works exceptionally well is "Flexible Kwik Seal Tub and Tile Caulk" (TM) marketed by DAP, Inc.

The first step in practicing the method is to determine the area of the vehicle body to be repaired (FIG. 4). One must then cut the plastic sheet 20 to match the desired area of the vehicle body to be covered. If possible, the plastic sheet 20 should be cut so that its edge comes up to a sharp bend or to a molding strip or to some other deviation in the body surface so that the edge of the plastic sheet 20 is not readily apparent in the final repair job.

The area 10 to be repaired should be prepared so that it is reasonably smooth and reasonably free of peeling, flaking rust. A loose chunk of rust between the plastic sheet 20 and the surface being repaired could create a bulge in plastic sheet 20. While the preparation need not be as extensive as is normally the case in auto body repair techniques, some preliminary precautions should be taken.

The edges of the plastic sheet are then beveled by the use of a razor knife or the like. This results in beveled edges 21 as shown in FIG. 3. In the alternative, the kit 50 could include plastic sheet with pre-beveled edges.

The adhesive 30 is then applied to the roughened back side of plastic sheet 20 and to the vehicle body area 10 to be repaired. As is common for contact adhesives, it should be applied at room temperature. If working in a colder area, a torch or other heating implement can be used to heat up the areas prior to application of the cement.

After the cement has had an opportunity to tackify, as is common practice with contact cements, the plastic sheet 20 is applied to the vehicle body over the area 10 to be repaired. The edges of the vinyl plastic sheet are then further sanded and any excess adhesive which is squeezed out around the edges of plastic sheet 20 is removed. Gasoline or other solvent can be used to remove excess adhesive. Gasoline is also used to wipe the entire surface of the plastic sheet 20 to improve adherence of the paint.

The beveled and sanded edge 21 of plastic sheet 20 is then covered with edge sealant 40. The excess is wiped away and sealant 40 is feathered out so as to create a smooth flowing surface from the exposed surface of plastic sheet 20 out onto the surface of the vehicle around the edges thereof. It is necessary to worry about beveling, sanding and the application of sealant only at edges of plastic sheet 20 which will be readily visible when the vehicle is viewed. Usually, it is not necessary to worry about this along bottom edges of rocker panels and the like where the repair job is rarely seen.

The thus repaired surface is painted in the usual manner. The results as can be seen from FIG. 1 is an attractive repaired surface. This is achieved with a minimum of expense in either terms of material or labor and accordingly constitutes a significant contribution to the art. Of course, it will be understood that alterations and variations can be made without departing from the spirit and broader aspects of the invention as set forth in the appended claims.

The embodiments of the invention in which an exclusive property or privilege is claimed are defined as follows:

1. A method for repairing an area of a vehicle body comprising: providing a thin sheet of stock plastic of sufficient size to cover the area to be repaired, said plastic sheet has a thickness of from about 20 mils to about 40 mils, said plastic sheet being sufficiently pliable that it can be manually shaped to conform generally to the area to be repaired, but sufficiently rigid to resist oil canning, denting and other localized deformation; cutting and shaping said plastic sheet to a size that it extends between ornamental deviations in the otherwise smooth surface of the vehicle being repaired whereby the edges of said plastic sheet are not as readily apparent to view; preparing the area of the vehicle to be repaired by making sure it is reasonably smooth and free of excessive flaking rust; manually shaping said plastic to conform generally to the area to be repaired; beveling the edges of said plastic sheet before said plastic sheet is adhered to the area to be repaired; adhering said plastic sheet to the vehicle area to be repaired with an adhesive; said method further including sanding the beveled edges of said plastic sheet to further effect blending with the vehicle surface after said plastic sheet is adhered to the area to be repaired; applying a sealant to at least the visible edges of said plastic sheet, feathering said sealant to create a smooth flowing surface from the surface of said plastic sheet to the surface of the vehicle, said sealant being of a material which dries firm, but resilient whereby cracking is minimized; painting the repaired area of the vehicle.

2. The method of claim 1 in which said plastic sheet is provided with a roughened rear surface; said adhering step being effected by applying contact cement to said roughened rear surfaces of said plastic sheet and to the area of said vehicle to be repaired and then placing said plastic sheet in position on said area to be repaired after said contact cement has had an opportunity to tackify.

3. The method of claim 1 in which said plastic sheet is polyvinyl chloride.

4. The method of claim 1 in which said plastic sheet is polyvinyl chloride.

* * * * *